(12) United States Patent
Varga

(10) Patent No.: US 6,515,221 B1
(45) Date of Patent: Feb. 4, 2003

(54) MODULAR REACTION WHEEL ASSEMBLY TO SHIELD ELECTRONICS ON A SATELLITE

(75) Inventor: Michael P. Varga, Safety Harbor, FL (US)

(73) Assignee: Honeywell International Inc., Morristown, NJ (US)

(*) Notice: Subject to any disclaimer, the term of this patent is extended or adjusted under 35 U.S.C. 154(b) by 51 days.

(21) Appl. No.: 09/630,103

(22) Filed: Aug. 1, 2000

(51) Int. Cl.[7] .................................................. H05K 9/00
(52) U.S. Cl. ...................................... 174/35 R; 244/165
(58) Field of Search ........................... 174/35 R, 35 MS; 361/800, 816, 818; 244/165, 158 R

(56) References Cited

U.S. PATENT DOCUMENTS 5,280,412 A * 1/1994 Podell et al. ................ 361/710
5,323,298 A * 6/1994 Shatas et al. ................ 361/816
5,571,991 A * 11/1996 Highum et al. ........ 174/35 MS
5,583,750 A * 12/1996 Nakata et al. ............... 361/816
5,717,576 A * 2/1998 Van Doeselaar et al. ... 361/816
5,950,965 A * 9/1999 Epstein et al. .......... 244/155 R
6,241,194 B1 * 6/2001 Heiberg ....................... 244/165

FOREIGN PATENT DOCUMENTS

WO     WO 02/10015 A1 * 2/2002

* cited by examiner

*Primary Examiner*—Hung V. Ngo
(74) *Attorney, Agent, or Firm*—Robert E. Greenstien

(57) ABSTRACT

Reaction wheels are placed around an enclosure so that the reaction wheel rotors provide a radiation shield for electronic components inside the enclosure.

7 Claims, 2 Drawing Sheets

MODULAR REACTION WHEEL ASSEMBLY TO SHIELD ELECTRONICS ON A SATELLITE

BACKGROUND

This invention relates to satellites, in particular, using reaction wheel assemblies (RWA) to provide a radiation shield for electronics on a satellite and simplify the integration of RWA's and electronics in a satellite system.

An RWA comprises a dense, metalic rotor and electronics to change the speed of its rotation. A plurality of RWAs are deployed on a satellite along different rotor axis producing an aggregate angular momentum the direction and magnitude of which is varied, by changing the speed of the RWAs, to change satellite attitude spherically (rotate the satellite).

Typically, the RWAs are located at different locations in the satellite payload area and connected by cables to associate electronics. The electronics needs to be shielded from ambient radiation found in space, and the common technique is to place the electronics in a metal container.

SUMMARY OF THE INVENTION

An object of the present invention is provide a modular reaction wheel assembly with the electronics inside and protected from radiation.

According to the invention, the rotors are used to shield the electronics. In particular, the RWAs are arranged around an electronics enclosure on their respective, required off-normal axis orientations to provide full attitude control, the electronics, on circuit boards are located with the enclosure and the RWA rotators, which are thick compared to the housing, provide a barrier between the circuit boards and radiation outside the enclosure. Connectors for the electronics are located on one surface between the RWAs and provide a barrier for one end of the circuit boards. The circuit boards are oriented inside the enclosure so that RWAs shield the surface (maximum exposure area of the electronics) of the circuits boards.

A feature of the present invention is that the RWA assembly can be installed as a singe unit on a satellite reducing integration costs. Another feature is that the total weight of RWA package (electronics and reaction wheels) is reduced compared to traditional approaches where each reaction wheel is separately mounted from the electronics. The invention takes advantage of the radiation shielding qualities of the rotors.

Other objects, benefits and features of the invention will apparent to one of ordinary skill in the art from the drawing and following description.

DESCRIPTION

Figure 1:
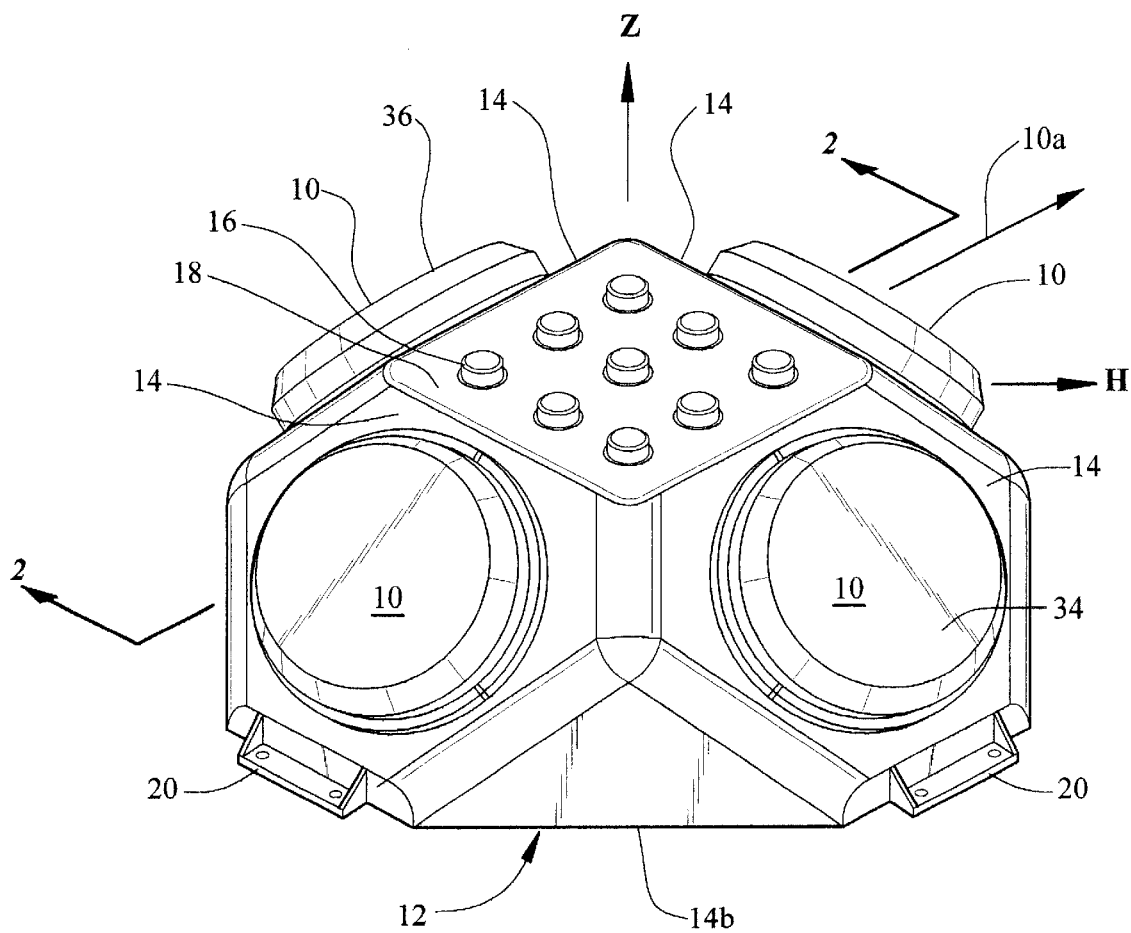
FIG. 1 is a perspective of a modular reaction wheel assembly according to the present invention.

In FIG. 1, four reaction wheels (RW) 10 are arranged around an enclosure 12, each on an inclined or sloped metal wall 14, giving the enclosure something like a igloo shape in perspective. In section, FIG. 2, the enclosure looks like a pyramid with a flat top. Each RW contains the rotator, not shown but mentioned above, and the rotational axis, e.g. axis 10a of each rotor (its associated angular momentum vector) points in a direction (normal to the wall 14) between horizon H and the zenith Z. Electronic connectors 16 are located on top metal surface 18. Brackets 20 are attached to walls 14 to attach the enclosure 12 to a surface on a satellite or spacecraft, not shown. The enclosure and the RWs comprise the RWA or reaction wheel assembly.

Figure 2:
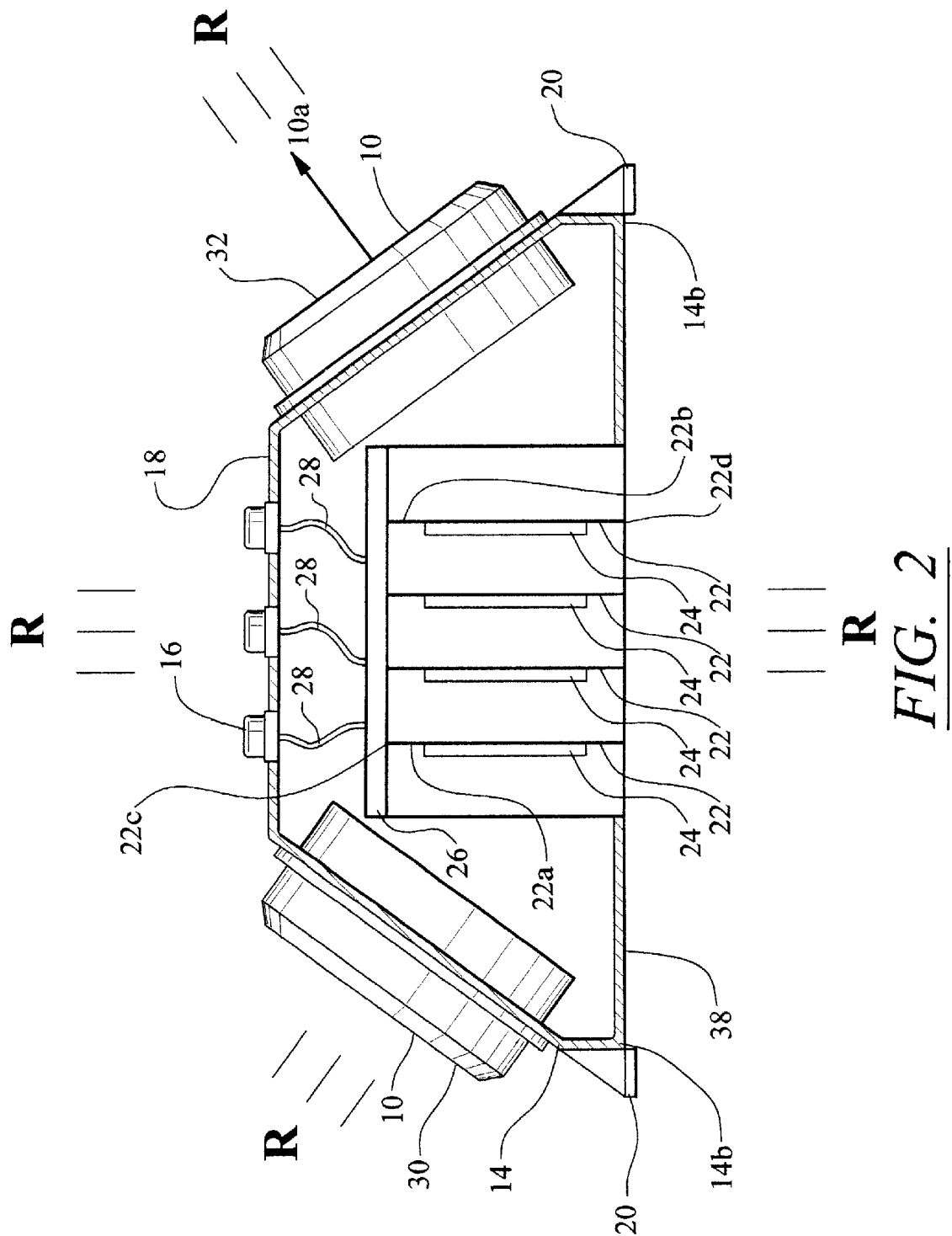
FIG. 2 is a section along line 2—2 in FIG. 1.

The four surfaces or walls 14, to which the RWAs 10 are attached, may be stamped from a single metal piece along with the op surface 16, giving the enclosure a shape resembling an igloo and roof-like in section, as shown in FIG. 2. The surface area, diameter shape of the wall 14 and the RWA 10 are substantially the same. The wall 14 surface area, in other words, is only large enough to support the reaction wheel.

Referring to FIG. 2, a plurality of circuit boards 22, each containing components 24, such as multichip module on the top surface 22a, is vertically oriented inside the enclosure 12. As a practical matter, sometimes components are located on the top and bottom surfaces. Each circuit board 22 is plugged into a bus or card slot 26 and connected by a cable 28 to a connector 16.

The top 22a and bottom 22b surfaces of each board 22 are within the shadow of the RWAs 10. To be more precise, radiation R outside the enclosure 12 is deflected or absorbed by RWA 30 or RWA 32. Similarly, RWA 34 and 36, shield the vertical edges of the boards. However, it can be appreciated that the area of maximum possible exposure and damage is on those bottom and top surfaces, where components are typically connected. It is possible to locate additional boards, orthogonal to boards 22, in which case the RWAs 34 and 36 would shield the bottom and top surfaces (containing components, such as components 24) of those boards and RWAs 30 and 32 would shield the vertical edges.

The surface 18, as well as the connectors 16, shield the top (horizontal) edges 22c of the boards, but as explained before, the surface area from that exposure angle is small. Likewise, the bottom edges 22d, also a small area exposed to radiation R, are shielded by a removable metal floor 38, by which the interior is accessed.

One skilled in the art may make modifications, in whole or in part, to a described embodiment of the invention and its various functions and components without departing from the true scope and spirit of the invention.

What is claimed is:

1. A reaction wheel assembly, comprising:
   a metal enclosure comprising first and second opposed surfaces;
   a pair of reaction wheels, each located on said first and second opposed surfaces and having an axis of rotation normal to said surfaces; and
   a circuit board located within the enclosure and located between said pair of reaction wheels.

2. The assembly described in claim 1, further comprising:
   third and fourth opposed surfaces connecting said first and second surfaces; and
   a second pair of reaction wheels, one on each of said third and fourth opposed surfaces and having an axis of rotation normal to said surfaces.

3. The assembly described in claim 2, wherein:
   a section of said metal enclosure on a plane passing through said first and second opposed surfaces appears as a pyramid with a flat top and a base that connects said first and second opposed surfaces and a section of said metal enclosure on a plane passing through said third and fourth opposed surfaces appears as a pyramid with a flat top and a base that connects said third and fourth opposed surfaces.

4. The assembly described in claim 3, wherein:

said top contains a connector electrically connected to said circuit board.

5. The assembly described in claim 1, wherein:

the diameter of said first and second surfaces at least equals the diameter of the each of said pair of reaction wheels.

6. The assembly described in claim 1, wherein:

shape of said first and second surfaces is only large enough to completely support each of said pair of reaction wheels.

7. A modular reaction wheel assembly, comprising:

a metal enclosure comprising:
  a base;
  a top that is parallel with said base;
  a first wall that extends at an angle from said base to said top;
  a second wall opposite said first wall that extends at said angle from said base to said top;
  a third wall that connects said first and second walls and extends at said angle from said base to said top; and
  a fourth wall opposite said third wall that connects said first and second walls and extends at said angle from said base to said top;

a reaction wheel located on each of said first, second, third and fourth walls, a wheel in each said reaction wheel rotating on an axis that is normal to the wall on which the reaction wheel is located; and a plurality of circuit boards located inside said enclosure oriented so that the plane of each board extends vertically between said base and said top.

* * * * *